US012650589B2

(12) United States Patent (10) Patent No.: US 12,650,589 B2
Lee et al. (45) Date of Patent: Jun. 9, 2026

(54) LARGE DISPLACEMENT PRECISION POSITIONING ADJUSTMENT APPARATUS

(71) Applicant: Andong National University Industry-Academic Cooperation Foundation, Andong-si (KR)

(72) Inventors: Sang Heon Lee, Andong-si (KR); Sang Mun Kim, Gyeongsangbuk-do (KR); Hag Yong Kihm, Daejeon (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 275 days.

(21) Appl. No.: 18/508,786

(22) Filed: Nov. 14, 2023

(65) Prior Publication Data

US 2024/0184093 A1 Jun. 6, 2024

(30) Foreign Application Priority Data

Dec. 5, 2022 (KR) ........................ 10-2022-0167884

(51) Int. Cl.
G02B 23/16 (2006.01)
G02B 23/02 (2006.01)
(52) U.S. Cl.
CPC ............. G02B 23/16 (2013.01); G02B 23/02 (2013.01)
(58) Field of Classification Search
None
See application file for complete search history.

(56) References Cited

U.S. PATENT DOCUMENTS

| | | | | |
|---|---|---|---|---|
| 3,942,865 A | * | 3/1976 | Rand | G02B 23/165 |
| | | | | 359/430 |
| 5,969,892 A | | 10/1999 | Slusher | |
| 6,478,434 B1 | | 11/2002 | Streetman et al. | |
| 2005/0052761 A1 | * | 3/2005 | Bennett | G02B 26/06 |
| | | | | 359/872 |
| 2013/0322471 A1 | * | 12/2013 | Rossbach | H01S 3/07 |
| | | | | 359/849 |

OTHER PUBLICATIONS

Warden, R. M., "Cryogenic Nano-actuator for JWST", Proceedings of the 38th Aerospace Mechanisms Symposium, Langley Research Center (2006).
https://www.thorlabs.com/newgrouppage9.cfm?objectgroup_id=9776.

* cited by examiner

*Primary Examiner* — Jennifer D. Carruth
(74) *Attorney, Agent, or Firm* — You & IP, LLC

(57) ABSTRACT

Proposed is a large displacement precision positioning adjustment apparatus including a mirror at an upper end, a fixed plate at a lower portion, linear driving parts including a linear driver performing a large displacement fine operation and a movement supporting part including a guide guiding a movement direction and a fixing part fixing the driver. The linear driver includes a first rotation driving part performing a large displacement movement, a third rotation driving part, a second rotation driving part performing a fine movement, and a moving shaft. The linear driving part includes an upper end connection part connecting an upper end of the linear driving part to the mirror, and a lower end connection part connecting a lower end of the linear driving part and the fixed plate, a first controller controlling a position of the linear driving part, and a second controller controlling a position of the mirror.

9 Claims, 18 Drawing Sheets

3632-b

3634

3613

LARGE DISPLACEMENT PRECISION POSITIONING ADJUSTMENT APPARATUS

CROSS REFERENCE TO RELATED APPLICATION

The present application claims priority to Korean Patent Application No. 10-2022-0167884, filed Dec. 5, 2022, the entire contents of which are incorporated herein for all purposes by this reference.

STATEMENT REGARDING GOVERNMENT SPONSORED RESEARCH

This invention was supported by the National Research Foundation of Korea funded by the Ministry of Science and ICT of Republic of Korea. [Research Program name: "Space Challenge"; Research Project name: "Development of the deployment and fine alignment system for segmented deployable mirror for space telescope"; Project Serial Number: 1711157360; Research Project Number: 2021M1A3B8077127]

BACKGROUND OF THE INVENTION

Field of the Invention

The present disclosure relates to an apparatus capable of adjusting a position and a direction of a mirror in space. More particularly, the present disclosure relates to a large displacement precision positioning adjustment apparatus capable of significantly precisely adjusting a position and a orientation of a mirror in space.

Description of the Related Art

In an optical telescope, an image with a higher resolution may be obtained as the size of a lens increases. However, since there are limits to increasing the size of the lens with just one mirror due to limitations in volume and weight, several mirror segments with small volume and small weight are used as one large mirror such as the James Webb Space Telescope. Therefore, an in-phase operation is required to realize several mirror segments like one mirror, and this work should be performed while the position and the orientation of each mirror segment is significantly and finely adjusted, i.e., the posture of each mirror segment is required to be significantly and finely adjusted. Therefore, for each mirror segment, an apparatus capable of finely adjusting the position of the mirror is required.

Meanwhile, since an astronomical telescope is capable of securing a clearer image in space without air, the astronomical telescope is operated in a state in which the astronomical telescope is carried on a space launch vehicle and goes into space. Since the space launch vehicle has a limited loading space, it is advantageous if the astronomical telescope is capable of being folded into a shape of mirror segments. Furthermore, in order to prevent damage of the mirror due to large gravitational acceleration and large vibration during the space launch, each mirror segment is required to be stored in some sort of a storage space. In addition, when the astronomical telescope arrives in space, the folded portion is unfolded, and each mirror segment is moved to an initial position of the mirror in the storage space, and then each mirror segment is formed as one mirror through the in-phase operation.

Therefore, a position adjustment apparatus of the mirror segment is required to be capable of controlling a significantly fine position adjustment in order to perform the in-phase operation as described above and, at the same time, the position adjustment apparatus is required to be capable of performing a large displacement movement for moving the mirror segment to the initial position from the storage space.

In addition, since the position adjustment apparatus of the mirror segment is operated in space, the position adjustment apparatus is required to be capable of overcoming extreme operating environments such as a large temperature change, an extremely low temperature, and vacuum. In addition, in order to reduce the cost of the space launch, the number of components and the weight of the position adjustment apparatus are also required to be reduced.

In a conventional research conducted so as to satisfy these requirements required for the position adjustment apparatus of the mirror segment, intended purpose was achieved by arranging a driver having a fine movement part and a large displacement movement part as a main driver in a parallel structure as illustrated in FIG. 3, in which the fine movement part includes one step motor, a displacement reduction apparatus, and a cam, and the large displacement movement part includes a tumbler coupling, a ball screw, and a nut.

In the conventional driver, torque generated from one step motor is transmitted to the fine movement part, and a precision movement is continuously performed along with a rotation of the motor. Furthermore, a large displacement movement is performed through the tumbler coupling that allows power transmission to be selectively performed by arbitrarily enlarging backlash.

However, since the fine displacement movement and the large displacement movement using the tumbler coupling are intended to be achieved simultaneously by separating the power of one motor into fine displacement and large displacement using backlash, there is a disadvantage that the control is complicated. In addition, when a target point is exceeded in the large displacement movement, the control is complicated since the backlash is required to be overcome and the control is performed in a reverse direction. Furthermore, the step motor is used to prevent exceeding the target point in the large displacement movement.

In addition, since the driver in the conventional technology is configured such that the fine movement part and the large displacement part exist separately, there is a disadvantage that the number of components, weight, and volume are increased.

Meanwhile, as another conventional technology for precise driving of large displacement, a technology of realizing a fine movement by using a difference between the dynamic friction coefficient and the static friction coefficient exists as illustrated in FIG. 4. In this technology, like the step motor, a step movement is performed according to a pulse input. However, there are disadvantages that the amount of movement during the step movement is not constant unlike the step motor, and the accumulation of errors increases when a large displacement movement is performed. In addition, since a piezo driver used in this technology cannot be driven at a temperature equal to or more than 135 degrees Celsius due to deterioration in characteristics, the piezo driver cannot be used in space due to a temperature difference between day and night.

DOCUMENT OF RELATED ART (Patent Document 1) "Motion Reducing Flexure Structure", U.S. Pat. No. 5,969,892A, Oct. 19, 1999.

(Patent Document 2) "Cryo Micropositioner", U.S. Pat. No. 6,478,434, Nov. 12, 2002.
(Non-Patent Document 1) Warden, R. M., "Cryogenic Nano-actuator for JWST", Proceedings of the 38th Aerospace Mechanisms Symposium, Langley Research Center (2006)
(Non-Patent Document 2) https://www.thorlabs.com/newgrouppage9.cfm?objectgroup_id=9776

SUMMARY OF THE INVENTION

Accordingly, the present disclosure has been made keeping in mind the above problems occurring in the related art, and an objective of the present disclosure is to provide an apparatus capable of stably adjusting a position of a mirror by being provided with a driver capable of performing a large displacement movement and a fine movement with a simple structure and a simple control in a space environment.

In order to achieve the above objectives, according to an embodiment of the present disclosure, there is provided a large displacement precision positioning adjustment apparatus including: a fixed lower plate; a mirror positioned to be spaced apart from an upper portion of the fixed lower plate; and a plurality of linear driving parts spaced apart from each other and coupled between the fixed lower plate and the mirror, the plurality of linear driving parts being configured to be stretchable with respect to the fixed lower plate, thereby adjusting a position of the mirror.

In addition, in order to achieve the above objectives, according to an embodiment of the present disclosure, each of the linear driving parts of the large displacement precision positioning adjustment apparatus may include: a linear driver supporting part coupled to the fixed lower plate; a linear driver guide part coupled to the mirror and the linear driver supporting part; a linear driver coupled to the linear driver supporting part and configured to move the linear driver guide part in a longitudinal direction; a first controller configured to adjust a length of the linear driver; and a second controller configured to adjust the position of the mirror through the first controller.

In addition, in order to achieve the above objectives, according to an embodiment of the present disclosure, the linear driver of the large displacement precision positioning adjustment apparatus may include: a rotation driving part configured to generate a rotational force; and a moving shaft configured to be rotated by the rotation driving part and to move in a linear line.

In addition, in order to achieve the above objectives, according to an embodiment of the present disclosure, the moving shaft of the large displacement precision positioning adjustment apparatus may be provided with threads, a moving shaft first rotation part configured to receive the rotational force through a non-contact interaction with the rotation driving part, and a moving shaft second rotation part configured to receive the rotational force through a contact interaction with the rotation driving part, and the threads, the moving shaft first rotation part, and the moving shaft second rotation part may be aligned along a movement direction.

In addition, in order to achieve the above objectives, according to an embodiment of the present disclosure, the moving shaft first rotation part of the large displacement precision positioning adjustment apparatus may be configured such that a cross-sectional area of the moving shaft first rotation part perpendicular to a rotation axis is uniformly formed along the movement direction, and the moving shaft first rotation part may be capable of receiving the rotational force constantly regardless of moving in the movement direction.

In addition, in order to achieve the above objectives, according to an embodiment of the present disclosure, the rotation driving part of the large displacement precision positioning adjustment apparatus may include a first rotation driver configured to transmit the rotational force to the moving shaft first rotation part with a non-contact interaction.

In addition, in order to achieve the above objectives, according to an embodiment of the present disclosure, the first rotation driver of the large displacement precision positioning adjustment apparatus may include a plurality of first rotation driver electromagnets, the first rotation driver may be capable of adjusting the movement direction and a movement speed of the moving shaft by adjusting an excitation order and an excitation speed of the first rotation driver electromagnets, and the first rotation driver may be capable of adjusting the rotational force of the moving shaft by adjusting power supplied to the first rotation driver electromagnets.

In addition, in order to achieve the above objectives, according to an embodiment of the present disclosure, the moving shaft second rotation part of the large displacement precision positioning adjustment apparatus may be configured such that a cross-sectional area of the moving shaft second rotation part perpendicular to a rotation axis is formed such that the cross-sectional area varies along the movement direction, and the moving shaft second rotation part may be capable of adjusting the rotational force according to a position of the moving shaft second rotation part.

In addition, in order to achieve the above objectives, according to an embodiment of the present disclosure, the rotation driving part of the large displacement precision positioning adjustment apparatus may include a second rotation driver configured to transmit the rotational force to the moving shaft second rotation part with a contact interaction.

In addition, in order to achieve the above objectives, according to an embodiment of the present disclosure, the second rotation driver of the large displacement precision positioning adjustment apparatus may include: a second rotation driver contact part in contact with the moving shaft second rotation part, thereby transmitting the rotational force; a plurality of second rotation driver electromagnets capable of moving the second rotation driver contact part in a circumferential direction or a radial direction of the moving shaft second rotation part; and a counter force apparatus configured to maintain contact between the second rotation driver contact part and the moving shaft second rotation part.

In addition, in order to achieve the above objectives, according to an embodiment of the present disclosure, the second rotation driver of the large displacement precision positioning adjustment apparatus may be capable of adjusting the movement direction and a movement speed of the moving shaft by adjusting an excitation order and an excitation speed of the second rotation driver electromagnets, and may be capable of adjusting the rotational force of the moving shaft by adjusting power supplied to the second rotation driver electromagnets.

In addition, in order to achieve the above objectives, according to an embodiment of the present disclosure, the second rotation driver of the large displacement precision positioning adjustment apparatus may be capable of adjusting a contact force between the second rotation driver contact part and the moving shaft second rotation part by adjusting power supplied to the second rotation driver electromagnets.

In addition, in order to achieve the above objectives, according to an embodiment of the present disclosure, a linear driver with a gear attached may replace the linear driver of the large displacement precision positioning adjustment apparatus.

In addition, in order to achieve the above objectives, according to an embodiment of the present disclosure, the linear driver with the gear attached of the large displacement precision positioning adjustment apparatus may include: a gear-attached rotation driving part configured to generate a rotational force; and a gear-attached moving shaft configured to be rotated by the gear-attached rotation driving part and to move in a linear line.

In addition, in order to achieve the above objectives, according to an embodiment of the present disclosure, the gear-attached moving shaft of the large displacement precision positioning adjustment apparatus may be provided with threads, a moving shaft third rotation part configured to receive the rotational force through a contact interaction with the gear-attached rotation driving part, and the moving shaft second rotation part configured to receive the rotational force through a contact interaction with the gear-attached rotation driving part, and the threads, the moving shaft third rotation part, and the moving shaft second rotation part may be aligned along the movement direction.

In addition, in order to achieve the above objectives, according to an embodiment of the present disclosure, the gear-attached rotation driving part of the large displacement precision positioning adjustment apparatus may include a third rotation driver configured to transmit the rotational force through a plurality of gears to the moving shaft third rotation part.

In addition, in order to achieve the above objectives, according to an embodiment of the present disclosure, the moving shaft third rotation part of the large displacement precision positioning adjustment apparatus may be configured such that a cross-section of the moving shaft third rotation part perpendicular to a rotation axis is formed in a polygonal shape such that a cross-sectional area of the moving shaft third rotation part has a same area in the movement direction of the gear-attached moving shaft, and a hole of the gear into which the moving shaft third rotation part is insert may be formed such that a shape of the hole is same as a shape of the cross-section and the hole has a large area.

In addition, in order to achieve the above objectives, according to an embodiment of the present disclosure, the second controller of the large displacement precision positioning adjustment apparatus may be configured to calculate a length of each of the linear driving parts required to adjust the position of the mirror and to transmit a calculated result to the first controller.

In addition, in order to achieve the above objectives, according to an embodiment of the present disclosure, the first controller of the large displacement precision positioning adjustment apparatus may be configured to adjust the length of each of the linear driving parts according to length information transmitted from the second controller.

In addition, in order to achieve the above objectives, according to an embodiment of the present disclosure, the first controller of the large displacement precision positioning adjustment apparatus may be capable of driving the linear driver such that the rotational force is simultaneously transmitted or independently transmitted to the moving shaft first rotation part and the moving shaft second rotation part.

According to the large displacement precision positioning adjustment apparatus of the present disclosure, the large displacement movement and the fine movement are capable of being driven by the simple structure and the simple control method, so that large displacement movement and the fine position adjustment of a mirror segment are capable of being performed with a small number of components, the simple controller, and a light and strong structure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an exemplary embodiment of the present disclosure will be described in detail with reference to the accompanying drawings.

However, in describing the present disclosure, description of known functions or known configurations will be omitted in order to clarify the gist of the present disclosure.

Upper (upper side), lower (lower side), left and right (side or lateral side), front (front side), rear (rear side), and the like designating directions in the description of the descriptions and the claims are determined on the basis of the relative positions between drawings or components for convenience of explanation, rather than limiting the scope of protection. Each of the directions described below is based on this, unless otherwise specifically limited.

Figure 1:
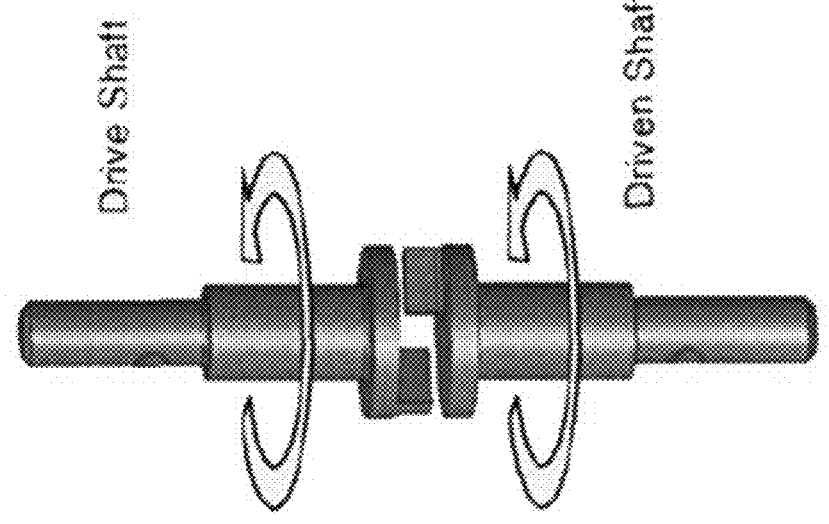
FIG. 1 is a view illustrating a configuration of a linear driver and a configuration of a tumbler coupling of a conventional large displacement precision position adjuster.
Figure 1:
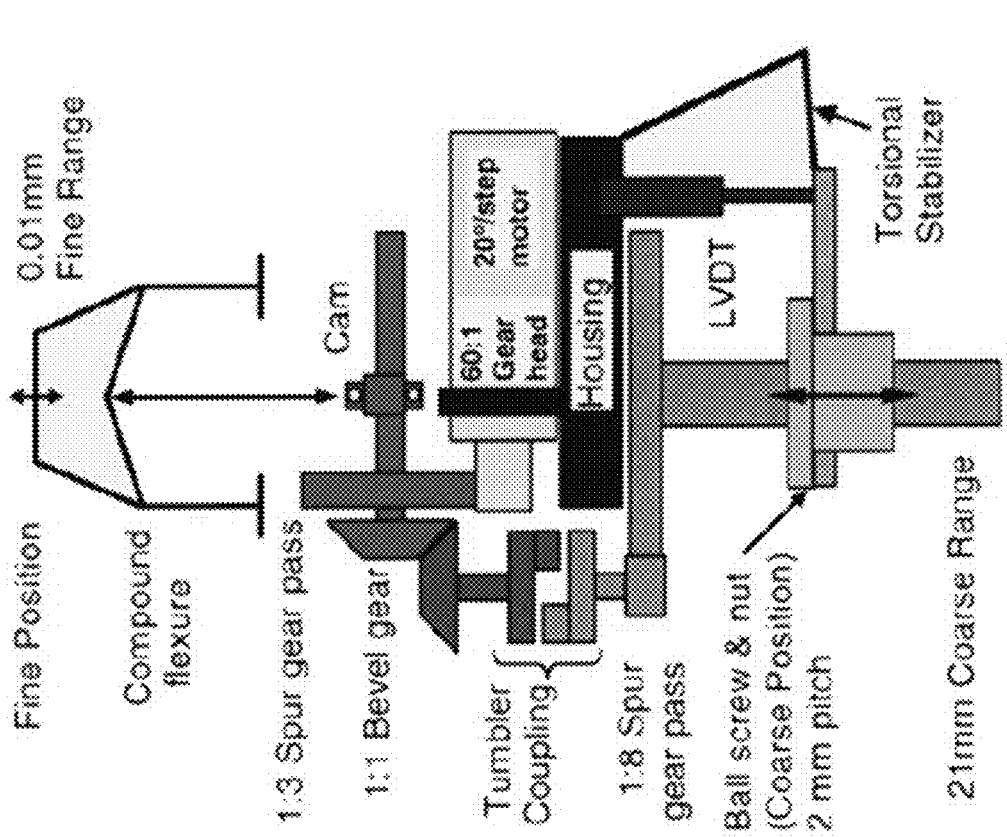
Figure 2:
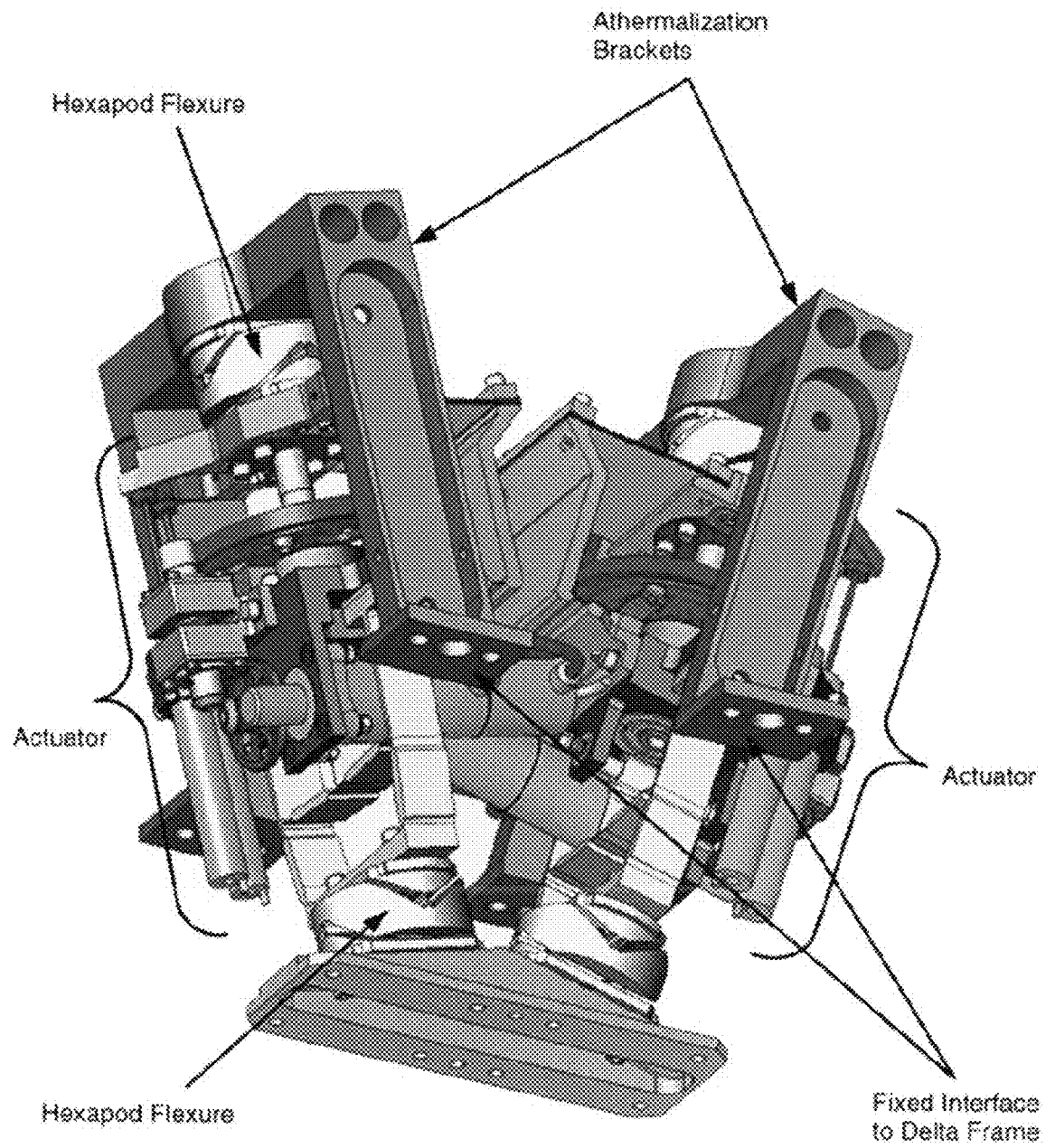
FIG. 2 is a view illustrating an example in which two linear drivers of the conventional large displacement precision position adjuster are connected to each other.
Figure 3:
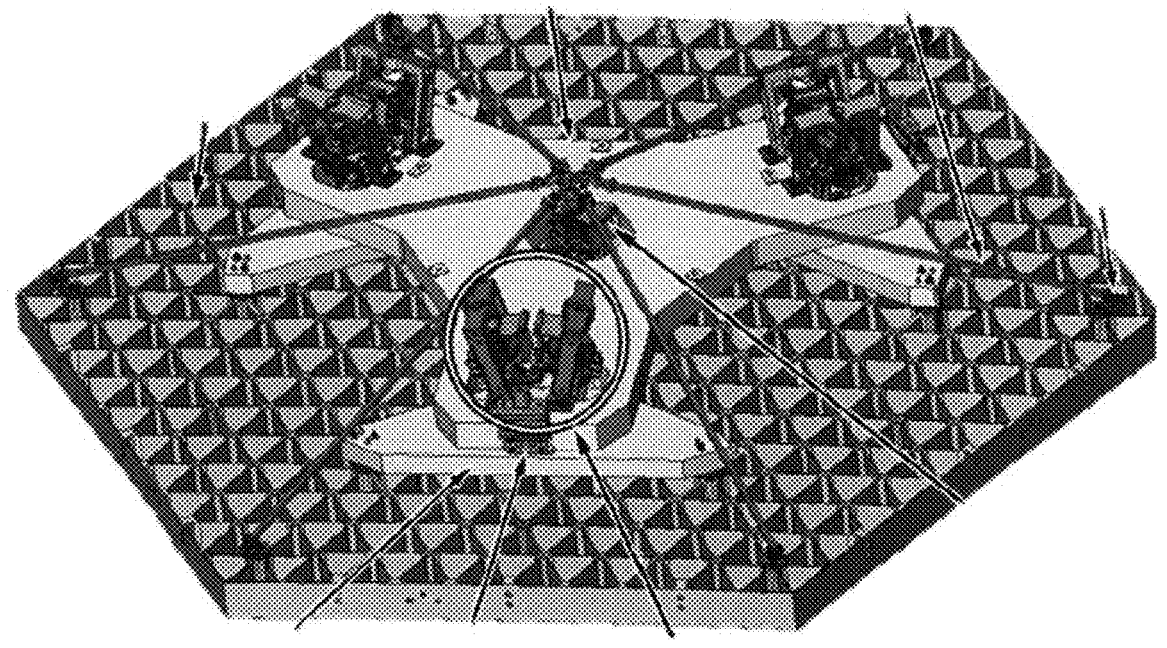
FIG. 3 is a view illustrating an arrangement example of the conventional large displacement precision position adjuster.
Figure 4:
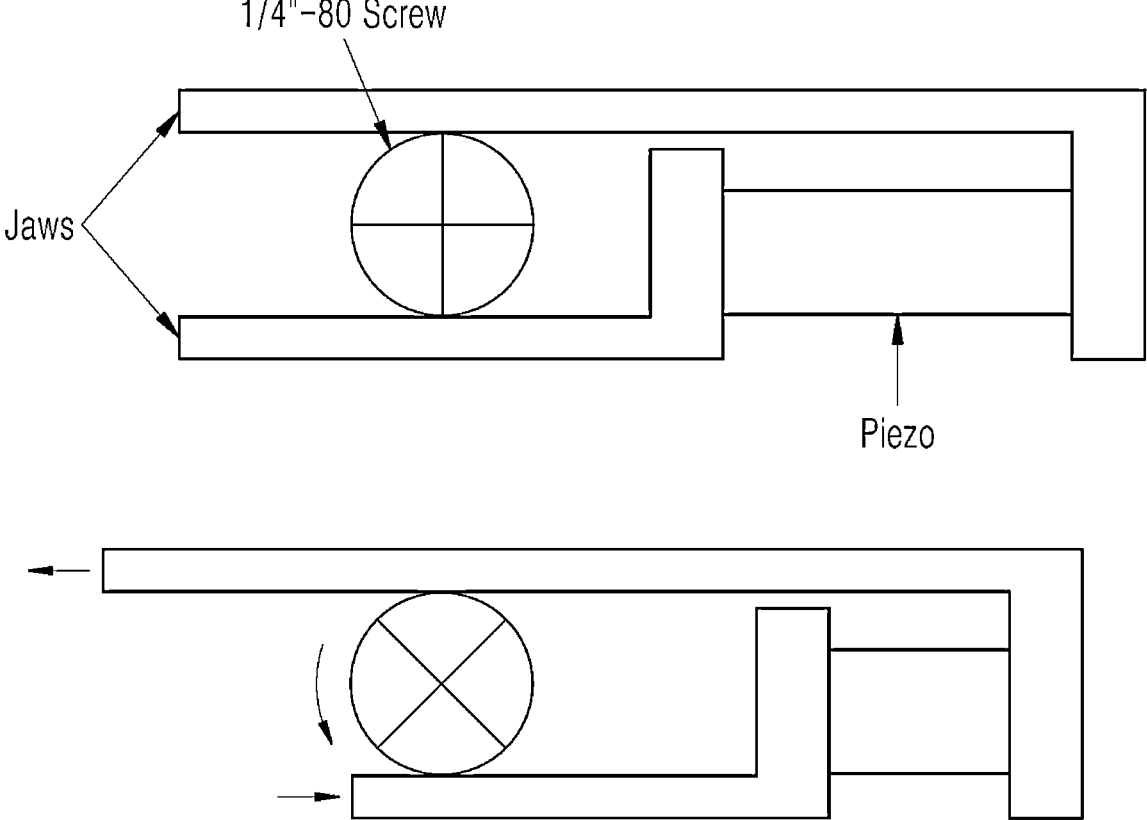
FIG. 4 is a view illustrating a configuration and a principle of a conventional large displacement precision linear driver.
Figure 5:
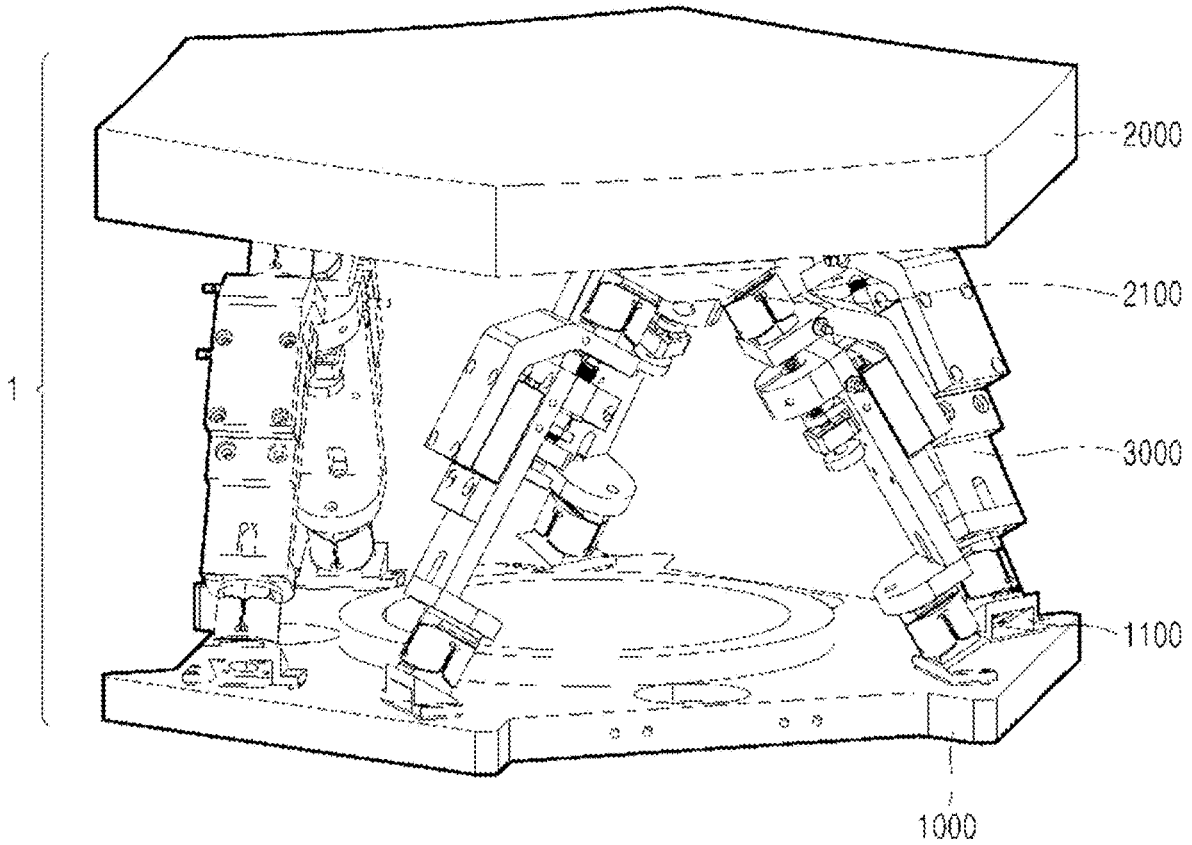
FIG. 5 is a perspective view illustrating a large displacement precision positioning adjustment apparatus according to an embodiment of the present disclosure.

Referring to FIG. 5, a large displacement precision positioning adjustment apparatus 1 according to an embodiment of the present disclosure includes a fixed lower plate 1000, a lower connection part 1100 connecting a plurality of linear driving parts 3000 and the fixed lower plate 1000 to each other, and an upper connection part 2100 connecting a mirror 2000 positioned above and the linear driving parts 3000 to each other.

The large displacement precision positioning adjustment apparatus 1 may adjust a position and a direction of the mirror 2000, i.e., a position, by adjusting a length of each linear driving part 3000.

Figure 6:
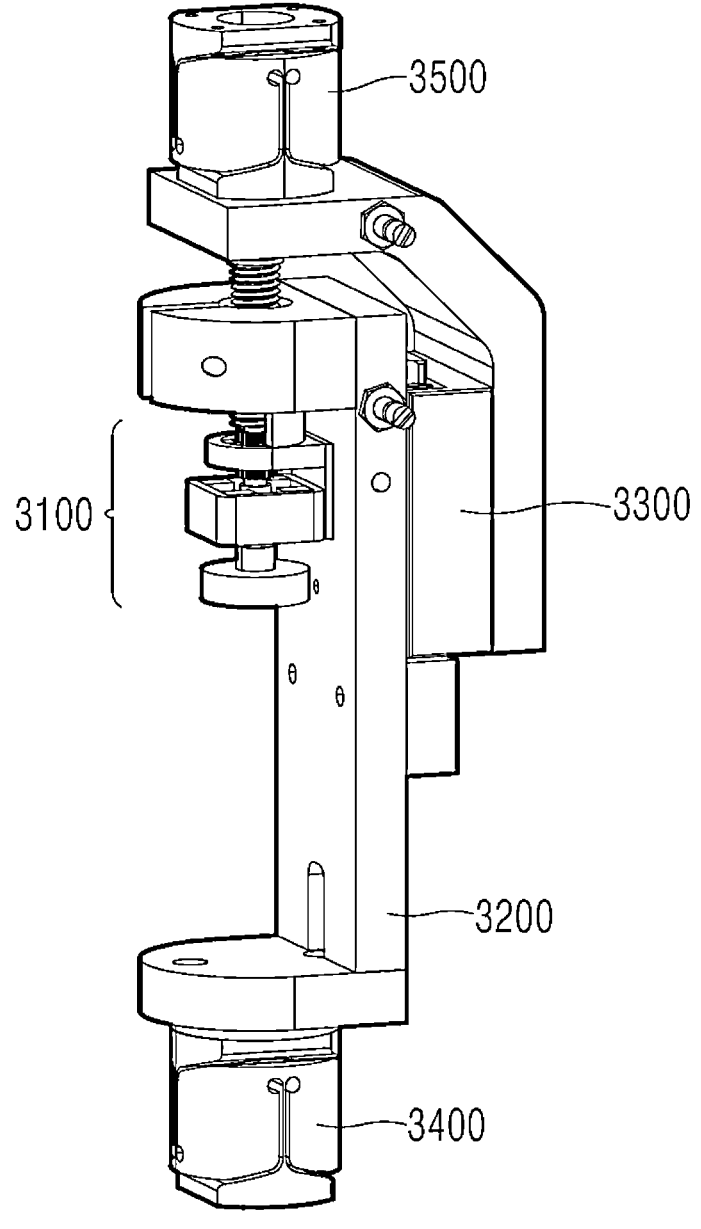
FIG. 6 is a perspective view illustrating a linear driving part according to an embodiment of the present disclosure.

Referring to FIG. 6, the linear driving part 3000 includes a linear driver 3100 capable of performing a large displacement precision movement, a linear driver supporting part 3200 fixing and stably supporting the linear driver 3100, a linear driver guide part 3300 connected to the linear driver supporting part 3200 and configured to guide the movement, a linear driver lower connection part 3400 connected to the lower connection part 1100, and a linear driver upper connection part 3500 connected to the upper connection part 2100.

The linear driver guide part 3300 is in contact with a moving shaft contact part 3111 of the linear driver 3100 and is configured to perform a relative motion according to a movement of a moving shaft 3110 of the linear driver 3100 with the linear deriver supporting part 3200 to which the linear driver 3100 is fixed, and the linear driver guide part 3300 is also configured to be moved in a moving shaft direction.

A pulling force caused by a spring is applied between the linear driver guide part 3300 and the linear driver supporting part 3200, so that the moving shaft contact part 3111 and the linear driver guide part 3300 are always in contact with each other.

Figure 7:
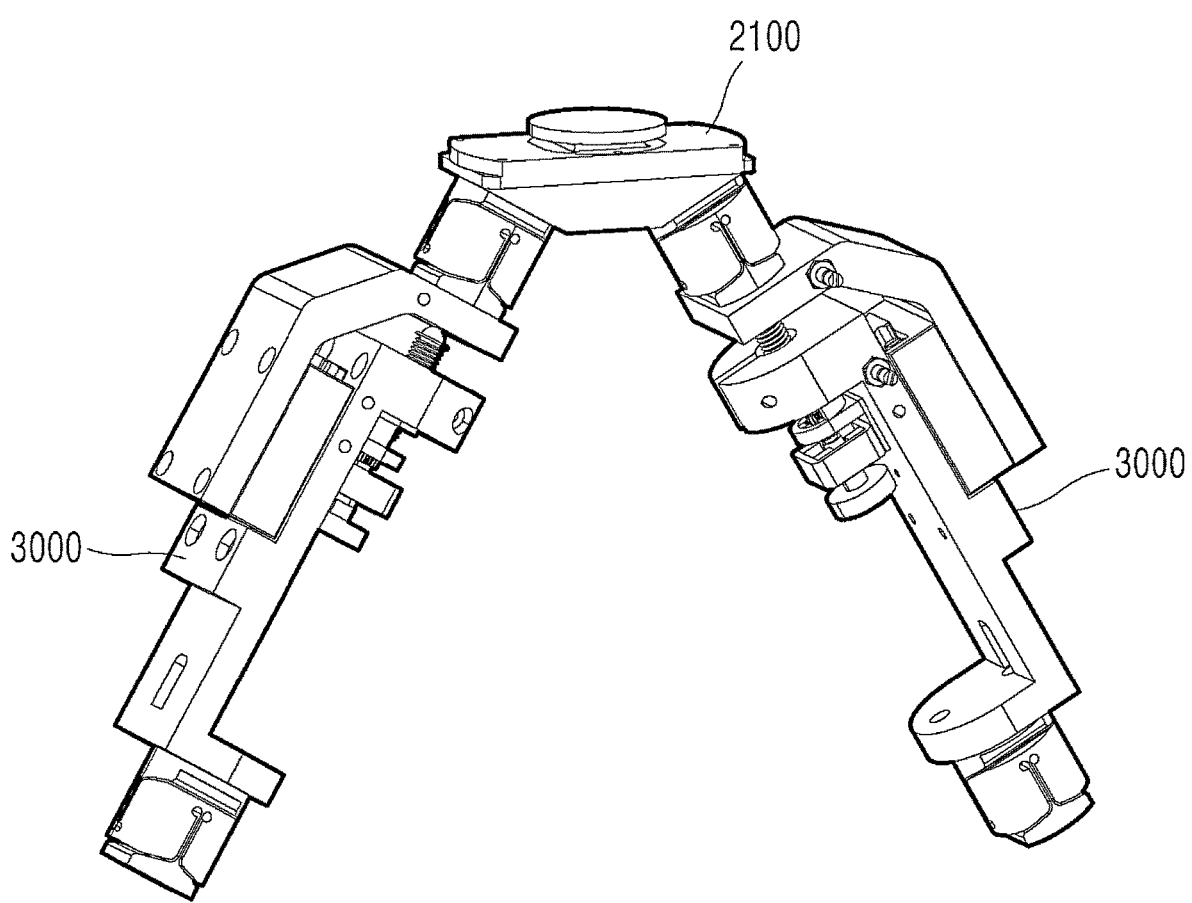
FIG. 7 is a perspective view illustrating a state in which two linear driving parts according to an embodiment of the present disclosure are connected to each other.

Referring to FIG. 7, the linear driving part 3000 is configured such that two linear driving parts 3000 are connected to each other as a pair by the upper connection part 2100, so that the pair of linear driving parts 3000 is capable of being attached to a mirror.

Figure 8:
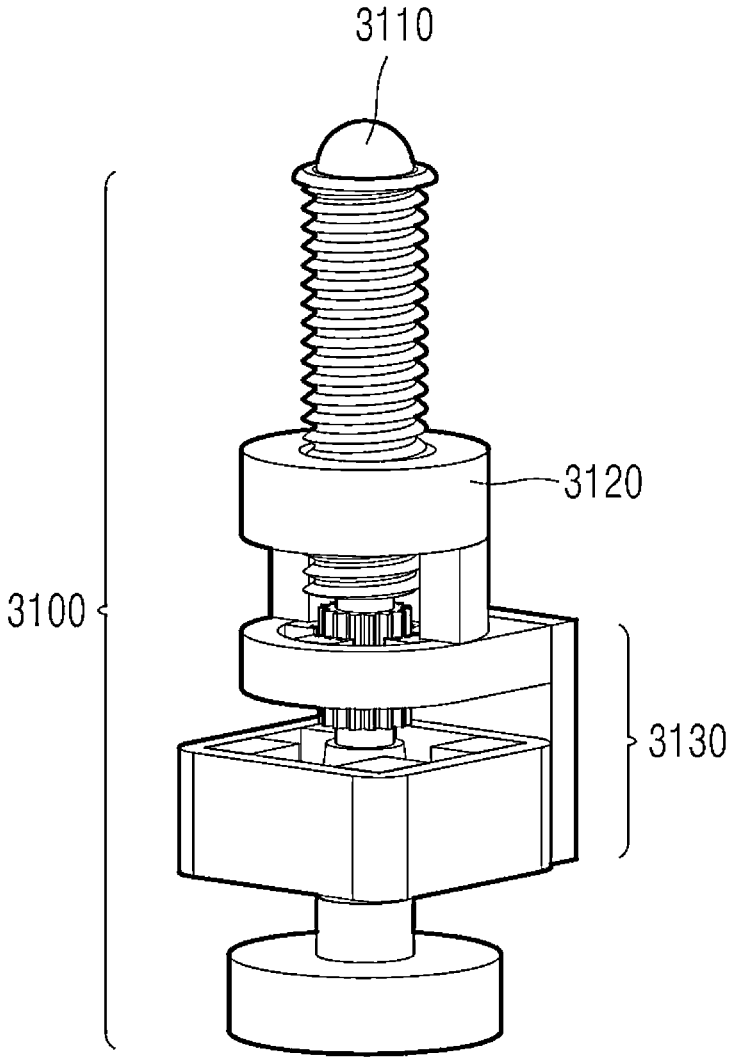
FIG. 8 is a perspective view illustrating the linear driving part including a first rotation driver and a second rotation driver according to an embodiment of the present disclosure.
Figure 9:
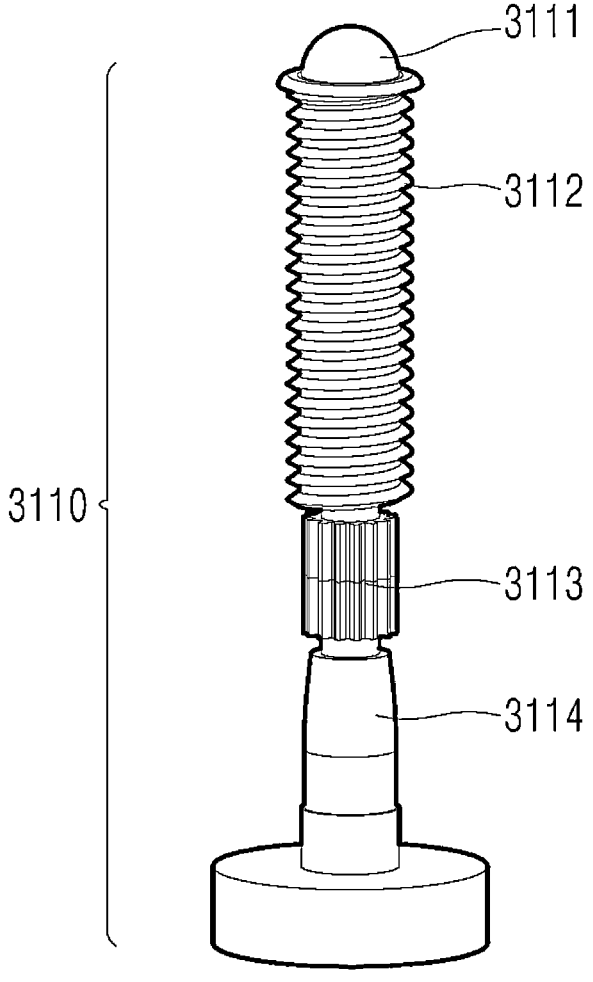
FIG. 9 is a perspective view illustrating a moving shaft including a first rotation part and a second rotation part, the moving shaft being provided in the linear driver of the present disclosure.
Figure 10:
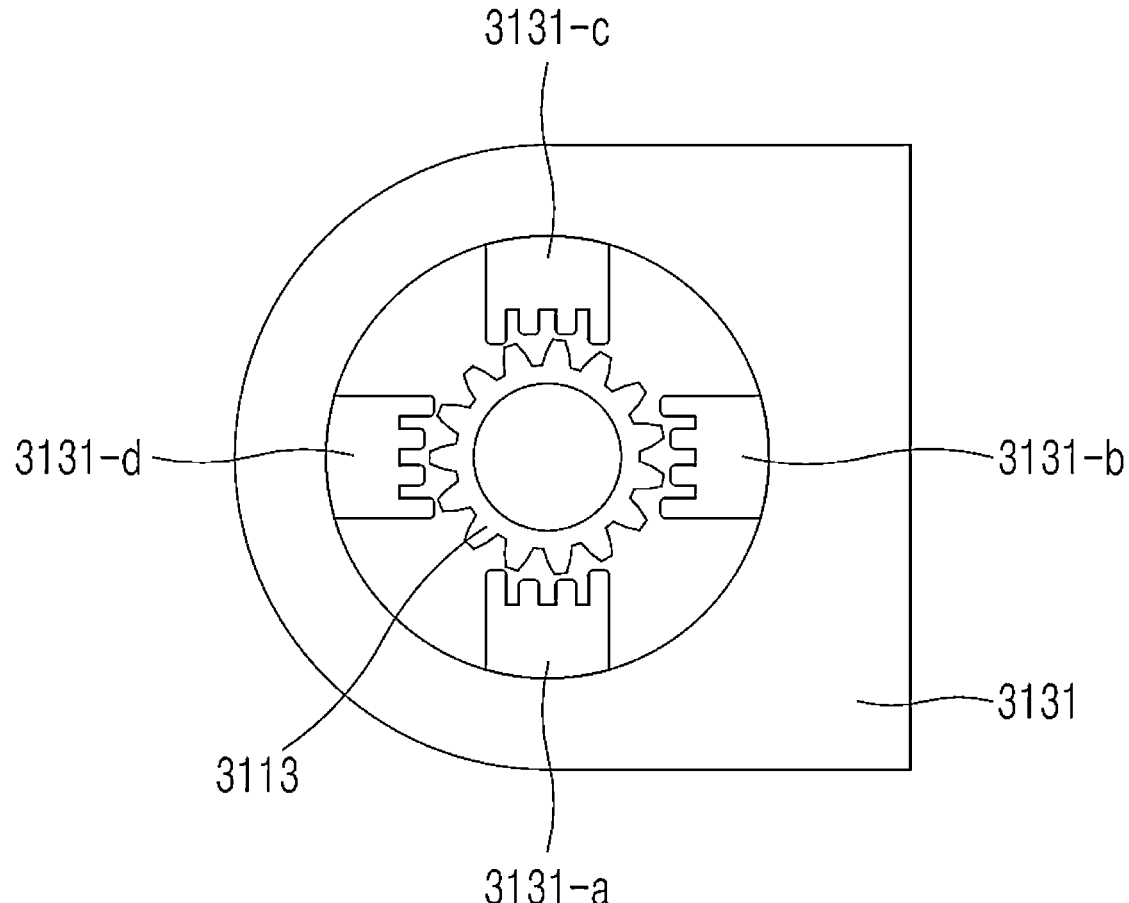
FIG. 10 is a plan view illustrating the first rotation driver provided in the linear driver of the present disclosure.

Referring to FIG. 8, the linear driver 3100 includes the moving shaft 3110 configured to perform a linear motion while the moving shaft 3110 is rotated by receiving a rotational force transmitted from a rotation driving part 3130, and includes a nut 3120 configured to convert a rotation movement into a linear movement.

Referring to FIG. 9, FIG. 10, FIG. 11, and FIG. 12, the moving shaft 3110 includes the moving shaft contact part 3111 in contact with the linear driver guide part 3300, moving shaft threads 3112 configured to convert a rotation movement into a linear movement, a moving shaft first rotation part 3113 configured to generate a rotational force by interacting with a first rotation driver 3131, and a moving shaft second rotation part 3114 configured to generate a rotational force by interacting with a second rotation driver 3132.

The first rotation driver 3131 includes a plurality of first rotation driver electromagnets 3131-*a*, 3131-*b*, 3131-*c*, and 3131-*d*, and is configured to generate a rotational force in the moving shaft first rotation part 3113 by an operation of each of the first rotation driver electromagnets 3131-*a*, 3131-*b*, 3131-*c*, and 3131-*d*. A rotation direction of the moving shaft first rotation part 3113 is capable of being changed by an operation order of the first rotation driver electromagnets 3131-*a*, 3131-*b*, 3131-*c*, and 3131-*d*, and a rotation speed of the moving shaft first rotation part 3113 is capable of being changed according to an operation speed of the first rotation driver electromagnets 3131-*a*, 3131-*b*, 3131-*c*, and 3131-*d*. Since a magnitude of the rotational force may be adjusted according to a magnitude of a current applied to the first rotation driver electromagnets 3131-*a*, 3131-*b*, 3131-*c*, and 3131-*d*, the first rotation driver 3131 may be responsible for a large displacement movement.

In the moving shaft 3110, the moving shaft first rotation part 3113 has a uniform cross-sectional area in a longitudinal direction of a rotation axis, so that the same rotational force may be provided even when the moving shaft 3110 is moved in a movement direction thereof.

The second rotation driver 3132 includes a plurality of second rotation driver electromagnets 3132-*a*, 3132-*b*, 3132-*c*, 3132-*d*, and 3132-*f*, and includes a second rotation driver contact part 3132-*e* which is in contact with the moving shaft second rotation part 3114 and which is configured to transmit a rotational force. The size of the cross-sectional area of the moving shaft second rotation part 3114 is changed in the moving shaft direction, so that the degree of contact with the second rotation driver contact part 3132-*e* at a specific position of the moving shaft second rotation part 3114 may be adjusted. In addition, since the second rotation driver contact portion 3132-*e* is connected to a counter force apparatus such as a spring, the degree of contact may be adjusted while a movement of the moving shaft second rotation part 3114 in an axis direction thereof is facilitated. Furthermore, the second rotation driver contact part 3132-*e* may be separated from the moving shaft second rotation part 3114 by an operation of the second rotation driver electromagnet 3132-*f*.

Figure 11:
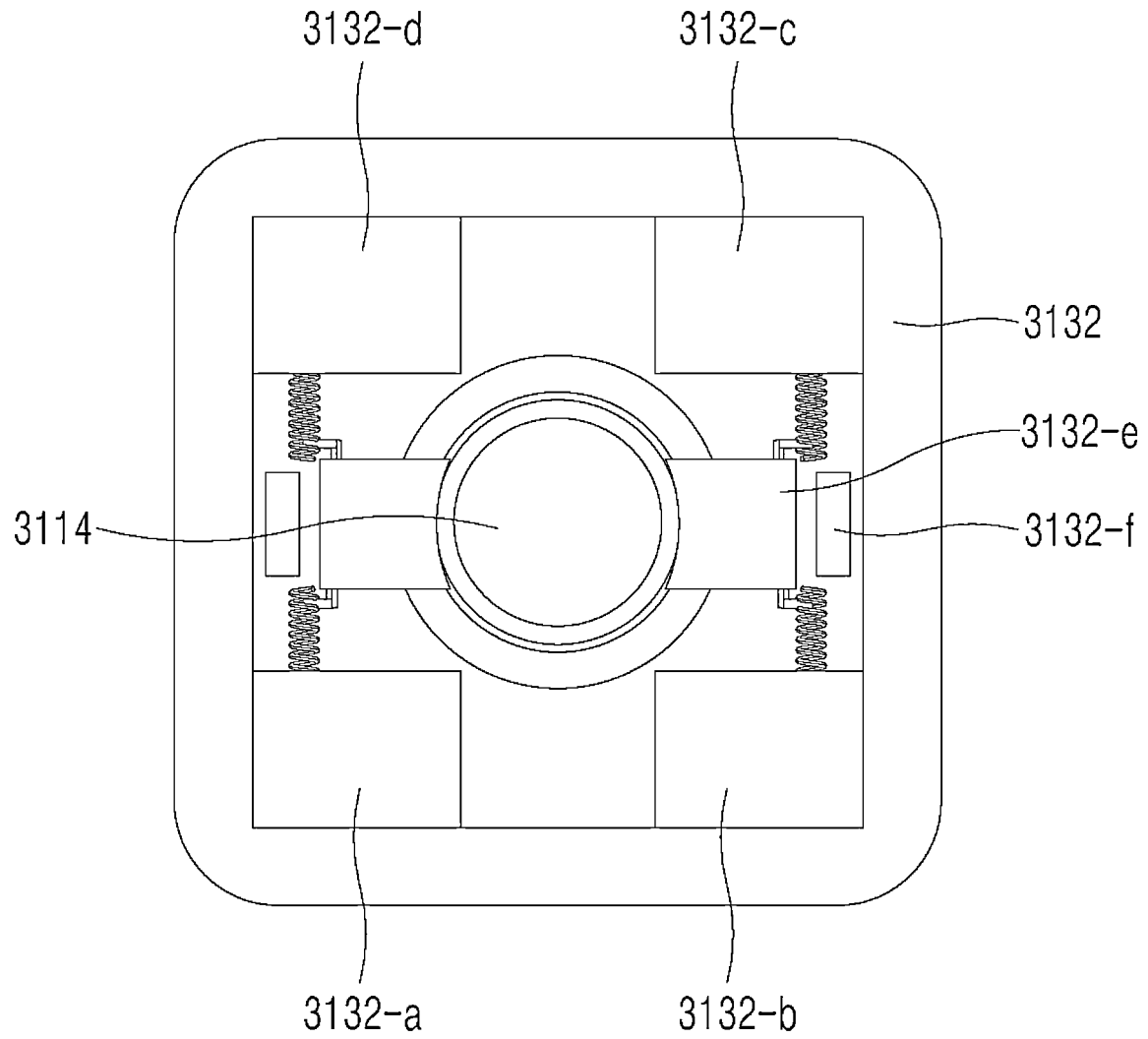
FIG. 11 is a plan view illustrating the second rotation driver provided in the linear driver of the present disclosure.
Figure 12:
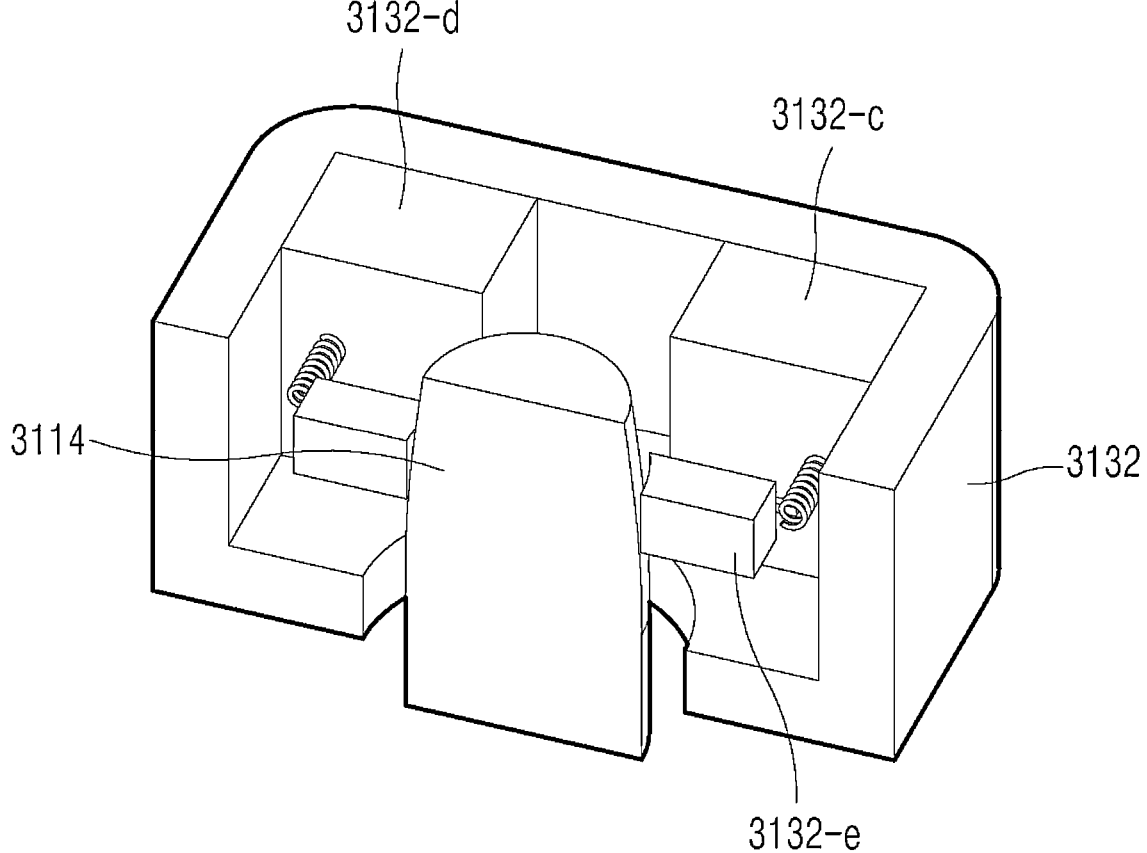
FIG. 12 is a cross-sectional view illustrating the second rotation driver provided in the linear driver of the present disclosure.
Figure 13:
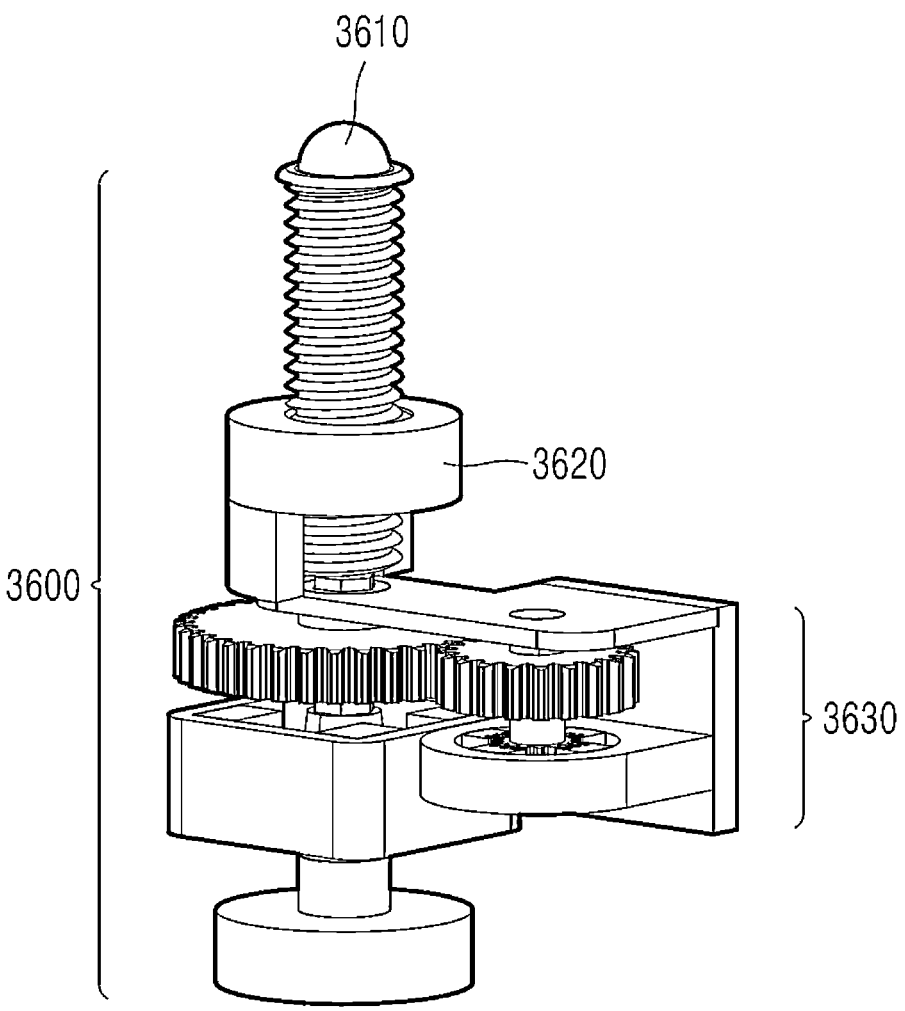
FIG. 13 is a perspective view illustrating the linear driver including a third rotation driver according to an exemplary embodiment of the present disclosure.
Figure 14:
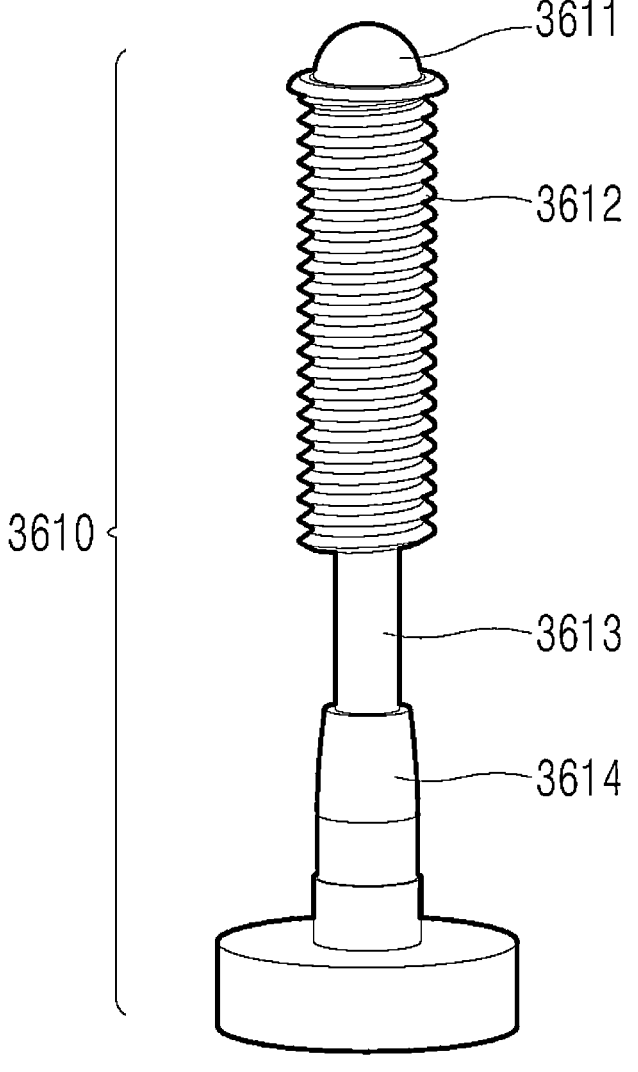
FIG. 14 is a perspective view illustrating the moving shaft including the second rotation part and a third rotation part, the moving shaft being provided in the linear driver of the present disclosure.
Figure 15:
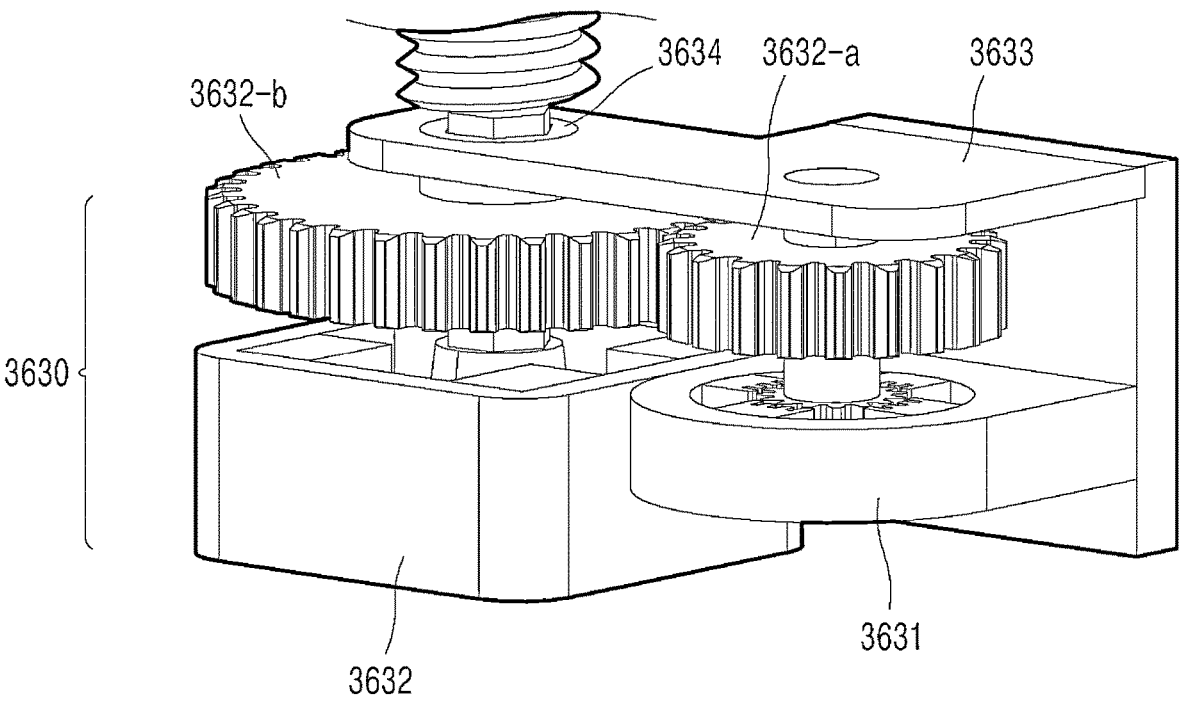
FIG. 15 is a perspective view illustrating a rotation driving part with a gear attached, the rotation driving part being provided in the linear driver of the present disclosure.
Figure 16:
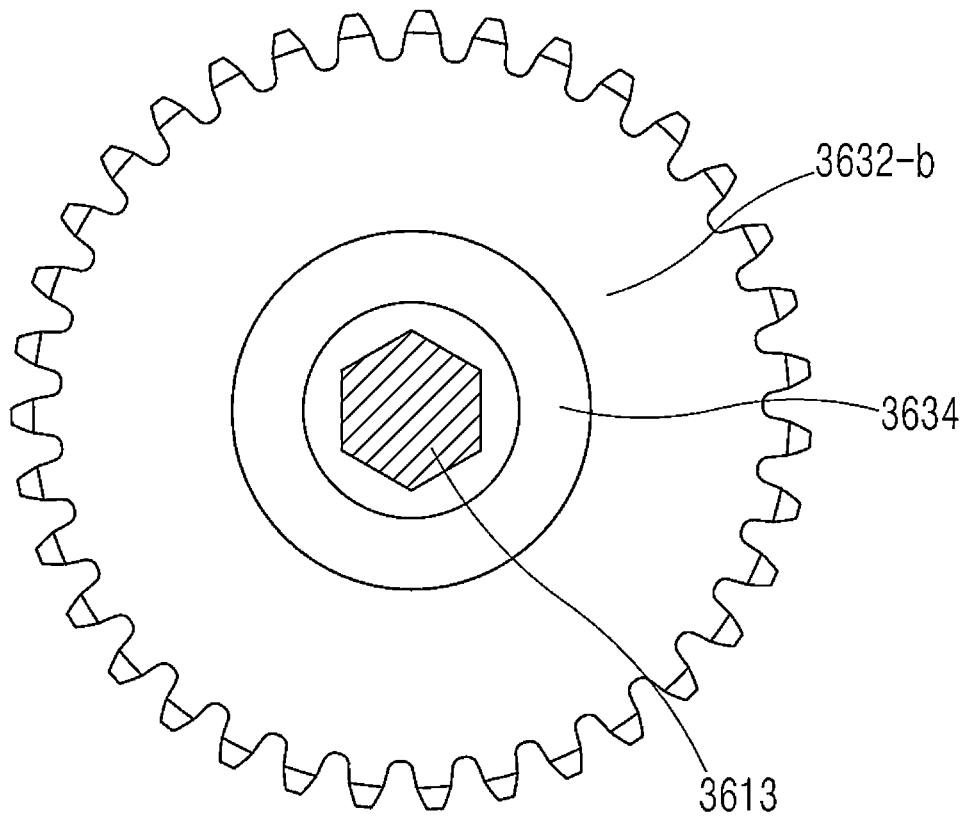
FIG. 16 is a plan view illustrating a shape in which the third rotation part provided in the linear driver and a gear of a third rotation driving part are coupled to each other.

In the second rotation driver 3132, the second rotation driver contact part 3132-*e* is moved by the second rotation driver electromagnets 3132-*a*, 3132-*b*, 3132-*c*, and 3132-*d*. In FIG. 11, the second rotation driver contact part 3132-*e* positioned at a right side is moved toward an upper end side when the second rotation driver electromagnet 3132-*c* is excited, and the second rotation driver contact part 3132-*e* is moved toward a lower end side when the second rotation driver electromagnet 3132-*b* is excited. In the same manner, when the second rotation driver electromagnet 3132-*d* and the second rotation driver electromagnet 3132-*a* are excited respectively, the second rotation driver contact part 3132-*e* positioned at a left side is moved toward the upper end side or the lower end side, respectively. Therefore, when the second rotation driver electromagnet 3132-*d* and the second rotation driver electromagnet 3132-*b* are excited at the same time, the corresponding portions of the second rotation driver contact part 3132-*e* is moved toward the upper end side and the lower end side, respectively, so that a rotational force in a clockwise direction is applied to the moving shaft second rotation part 3114 to which the second rotation driver contact part 3132-*e* is coupled.

Meanwhile, the rotational force is transmitted while the second rotation driver contact part 3132-*e* and the moving shaft second rotation part 3114 are in contact with each other. Generally, since there is a difference between a static friction coefficient and a dynamic friction coefficient, the rotational force transmitted to the moving shaft second rotation part 3114 through the second driver contact part 3132-*e* may be controlled according to a speed of exciting the second rotation driver electromagnets 3132-*a*, 3132-*b*, 3132-*c*, and 3132-*d*. Since the rotational force due to a frictional force is finely small, the second rotation driver 3132 may be used for a fine movement of the moving shaft 3110. The rotation direction transmitted to the moving shaft second rotation part 3114 may be determined by an excitation order of the second rotation driver electromagnets 3132-*a*, 3132-*b*, 3132-*c*, and 3132-*d*.

In the large displacement precision positioning adjustment apparatus 1, a linear driver 3600 with a gear attached may be used in order to increase a rotational force in the linear driver 3100.

Referring to FIG. 13, FIG. 14, FIG. 15, and FIG. 16, the linear driver 3600 with the gear attached includes a gear-attached moving shaft 3610, a nut 3620 configured to support the gear-attached moving shaft 3610 while converting a rotation movement into a linear movement, and a gear-attached rotation driving part 3630 including a third rotation driver 3631 and a second rotation driver 3632 to which a gear train is added on the basis of a shape of the first rotation driver 3131.

The moving shaft 3610 includes a moving shaft contact part 3611 in contact with the linear driver supporting part 3200, moving shaft threads 3612 configured to convert a rotation movement into a linear movement, a moving shaft third rotation part 3613 configured to generate a rotational force by interacting with the third rotation driver 3631, and a moving shaft second rotation part 3614 configured to generate a rotational force by interacting with the second rotation driver 3132.

The moving shaft third rotation part 3613 has a cross-sectional shape of a polygon having a uniform size in a moving direction, and a third rotation driver second gear 3632-*b* has a through hole which has a large size and which has a shape that is the same as the cross-sectional shape of the moving shaft third rotation part 3613, so that the third rotation driver second gear 3632-*b* is capable of being freely moved in a direction of the gear-attached moving shaft 3610 while being connected to the moving shaft third rotation part 3613 and receiving the rotational force. The third rotation driver second gear 3632-*b* is connected to a third rotation driver supporting part 3633 and is capable of being freely rotated, and receives the rotational force through a third rotation driver first gear 3632-*a* connected to the third rotation driver 3631.

In the linear driver 3600 with the gear attached, the second rotation driver 3632 may be used for a fine movement of the gear-attached moving shaft 3610 by being operated in the same manner as the second rotation driver 3132 of the linear driver 3100, and the third rotation driver 3631 may be used for the large displacement movement by being operated in the same manner as the first rotation driver 3131 of the linear driver 3100 except for the gear train.

In the linear driver 3100 or the linear driver 3600 with the gear attached, the first rotation driver 3131 or the third rotation driver 3631 is responsible for the large displacement movement, and the second rotation driver 3132 or 3632 is responsible for the fine movement. In the second rotation driver 3132 or 3632, since a rotational force is transmitted by a frictional force, a large load may be applied when the first rotation driver 3131 or the third rotation driver 3631 is driven, so that the cross-sectional shape or the moving shaft second rotation part 3114 or 3614 may be adjusted or the second rotation driver electromagnet 3132-*f* may be adjusted such that the frictional force is applied only when the large displacement movement reaches near a target point.

Figure 17:
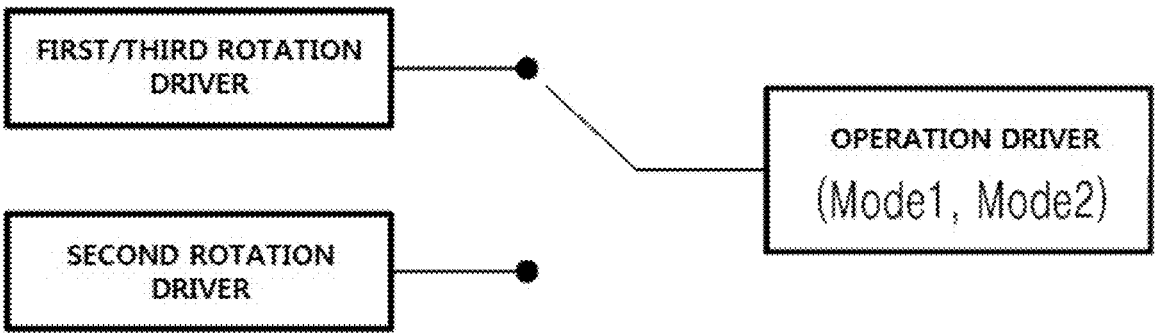
FIG. 17 is a view illustrating an operation method of the rotation drivers according to an exemplary embodiment of the present disclosure.

Referring to FIG. 17, in the linear driver 3100, the first rotation driver 3131 and the third rotation driver 3631 are responsible for the large displacement movement in the same driving method, and the second rotation driver 3132 or 3632 is responsible for the fine movement in a manner based on the frictional force. Since these two movements are implemented separately, switching may be used as required by using one driving driver that includes both operation modes.

Figure 18:
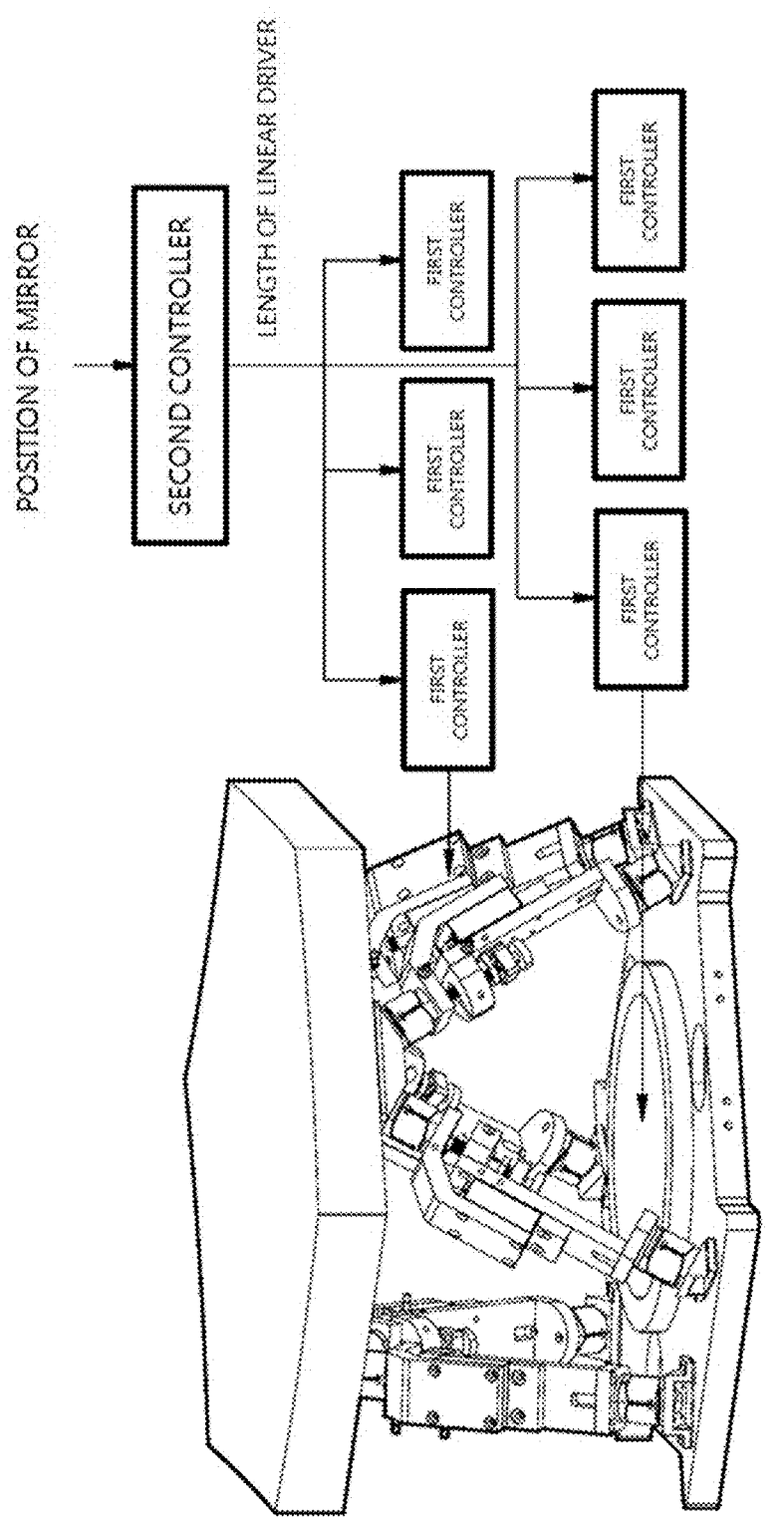
FIG. 18 is a view illustrating a configuration of controllers according to an exemplary embodiment of the present disclosure.

Referring to FIG. 18, in the large displacement precision positioning adjustment apparatus 1, when a position adjustment command of the mirror 2000 is received, functions are divided into a second controller and a first controller, in which the second controller is configured to calculate a length of each linear driver 3100 and the first controller is configured to receive length information transmitted to each linear driver 3100 and to control each linear driver 3100.

Although the specific embodiment of the present disclosure has been described and illustrated above, it is apparent to those skilled in the art that the present disclosure is not limited to the embodiment disclosed herein and various modifications and changes can be made without departing from the spirit and scope of the present disclosure.

Therefore, such modifications and changes should not be individually construed from the spirit or point of view of the present disclosure, and it should be understood that modified embodiments belong to the claims of the present disclosure.

What is claimed is:

1. A large displacement precision positioning adjustment apparatus comprising:

a fixed lower plate;

a mirror positioned to be spaced apart from an upper portion of the fixed lower plate; and a plurality of linear driving parts spaced apart from each other and coupled between the fixed lower plate and the mirror, the plurality of linear driving parts being configured to be stretchable with respect to the fixed lower plate, thereby adjusting a position of the mirror, wherein each of the linear driving parts comprises:

a linear driver supporting part coupled to the fixed lower plate;

a linear driver guide part coupled to the mirror and the linear driver supporting part;

a linear driver coupled to the linear driver supporting part and configured to move the linear driver guide part in a longitudinal direction;

a first controller configured to adjust a length of the linear driver; and a second controller configured to adjust the position of the mirror through the first controller, wherein the linear driver comprises:

a rotation driving part configured to generate a rotational force; and a moving shaft configured to be rotated by the rotation driving part and to move in a linear line, wherein the moving shaft is provided with threads, a moving shaft first rotation part configured to receive the rotational force through a non-contact interaction with the rotation driving part, and a moving shaft second rotation part configured to receive the rotational force through a contact interaction with the rotation driving part, and the threads the moving shaft first rotation part, and the moving shaft second rotation part are aligned along a movement direction, wherein the rotation driving part comprises a first rotation driver configured to transmit the rotational force to the moving shaft first rotation part with the non-contact interaction, the first rotation driver comprises a plurality of first rotation driver electromagnets, the first rotation driver is capable of adjusting the movement direction and a movement speed of the moving shaft by adjusting an excitation order and an excitation speed of the plurality of first rotation driver electromagnets, and the first rotation driver is capable of adjusting the rotational force of the moving shaft by adjusting power supplied to the plurality of first rotation driver electromagnets, and wherein the rotation driving part further comprises a second rotation driver configured to transmit the rotational force to the moving shaft second rotation part with the contact interaction, and the second rotation driver comprises:

a second rotation driver contact part in contact with the moving shaft second rotation part, thereby transmitting the rotational force;

a plurality of second rotation driver electromagnets capable of moving the second rotation driver contact part in a circumferential direction or a radial direction of the moving shaft second rotation part; and a counter force apparatus configured to maintain contact between the second rotation driver contact part and the moving shaft second rotation part, wherein at least one of the plurality of second rotation driver electromagnets is configured to separate the second rotation driver contact part from the moving shaft second rotation part.

2. The large displacement precision positioning adjustment apparatus of claim 1, wherein a cross-sectional area of the moving shaft first rotation part perpendicular to a rotation axis is uniformly formed along the movement direction, and the moving shaft first rotation part is capable of receiving the rotational force constantly regardless of the moving shaft moving in the movement direction.

3. The large displacement precision positioning adjustment apparatus of claim 1, wherein a cross-sectional area of the moving shaft second rotation part perpendicular to a rotation axis is formed such that the cross-sectional area varies along the movement direction, and the moving shaft second rotation part is capable of adjusting the rotational force according to a position of the moving shaft second rotation part.

4. The large displacement precision positioning adjustment apparatus of claim 1, wherein the second rotation driver is capable of adjusting the movement direction and a movement speed of the moving shaft by adjusting an excitation order and an excitation speed of the plurality of second rotation driver electromagnets, and is capable of adjusting the rotational force of the moving shaft by adjusting power supplied to the plurality of second rotation driver electromagnets.

5. The large displacement precision positioning adjustment apparatus of claim 1, wherein the second rotation driver is capable of adjusting a contact force between the second rotation driver contact part and the moving shaft second rotation part by adjusting power supplied to the plurality of second rotation driver electromagnets.

6. The large displacement precision positioning adjustment apparatus of claim 1, wherein the second controller is configured to calculate the length of each of the plurality of linear driving parts required to adjust the position of the mirror and to transmit a calculated result to the first controller.

7. The large displacement precision positioning adjustment apparatus of claim 1, wherein the first controller is configured to adjust the length of each of the plurality of linear driving parts according to length information transmitted from the second controller.

8. The large displacement precision positioning adjustment apparatus of claim 1, wherein the first controller is capable of driving the linear driver such that the rotational force is simultaneously transmitted or independently transmitted to the moving shaft first rotation part and the moving shaft second rotation part.

9. A large displacement precision positioning adjustment apparatus comprising:

a fixed lower plate;

a mirror positioned to be spaced apart from an upper portion of the fixed lower plate; and a plurality of linear driving parts spaced apart from each other and coupled between the fixed lower plate and the mirror, the plurality of linear driving parts being configured to be stretchable with respect to the fixed lower plate, thereby adjusting a position of the mirror, wherein each of the linear driving parts comprises:

a linear driver supporting part coupled to the fixed lower plate;

a linear driver guide part coupled to the mirror and the linear driver supporting part;

a linear driver with a gear attached, the linear driver with the gear attached being coupled to the linear driver supporting part and configured to move the linear driver guide part in a longitudinal direction;

a first controller configured to adjust a length of the linear driver with the gear attached; and a second controller configured to adjust the position of the mirror through the first controller, wherein the linear driver with the gear attached comprises:

a gear-attached rotation driving part configured to generate a rotational force; and a gear-attached moving shaft configured to be rotated by the gear-attached rotation driving part and to move in a linear line, wherein the gear-attached moving shaft is provided with threads, a moving shaft third rotation part configured to receive the rotational force through a contact interaction with the gear-attached rotation driving part, and a moving shaft second rotation part configured to receive the rotational force through a contact interaction with the gear-attached rotation driving part, and the threads, the moving shaft third rotation part, and the moving shaft second rotation part are aligned along a movement direction, wherein the gear-attached rotation driving part comprises a third rotation driver configured to transmit the rotational force through a plurality of gears to the moving shaft third rotation part, wherein a cross-section of the moving shaft third rotation
part perpendicular to a rotation axis is formed in a
polygonal shape such that a cross-sectional area of the
moving shaft third rotation part has a same area in the
movement direction of the gear-attached moving shaft,
and a hole of a gear of the plurality of gears into which
the moving shaft third rotation part is inserted is formed
such that a shape of the hole is same as a shape of the
cross-section and the hole has an area larger than the
cross-sectional area of the moving shaft third rotation
part such that the gear is capable of being freely moved
in the movement direction of the gear-attached moving
shaft while receiving the rotational force from the
moving shaft third rotation part, wherein the gear-attached rotation driving part further
comprises a second rotation driver configured to trans-
mit the rotational force to the moving shaft second rotation part with the contact interaction, and the sec-
ond rotation driver comprises:

a second rotation driver contact part in contact with the
moving shaft second rotation part, thereby transmitting
the rotational force;

a plurality of second rotation driver electromagnets
capable of moving the second rotation driver contact
part in a circumferential direction or a radial direction
of the moving shaft second rotation part; and a counter force apparatus configured to maintain contact
between the second rotation driver contact part and the
moving shaft second rotation part, wherein at least one of the plurality of second rotation
driver electromagnets is configured to separate the
second rotation driver contact part from the moving
shaft second rotation part.

* * * * *